US012673734B2

(12) United States Patent
Taylor

(10) Patent No.: US 12,673,734 B2
(45) Date of Patent: Jul. 7, 2026

(54) ADJUSTABLE AIR DEFLECTOR ACTUATOR ASSEMBLY

(71) Applicant: BROSE FAHRZEUGTEILE SE & CO. KOMMANDITGESELLSCHAFT, BAMBERG, Bamberg (DE)

(72) Inventor: Kim Taylor, Farmington Hills, MI (US)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 348 days.

(21) Appl. No.: 18/383,863

(22) Filed: Oct. 25, 2023

(65) Prior Publication Data

US 2025/0136197 A1 May 1, 2025

(51) Int. Cl.
B62D 35/00 (2006.01)

(52) U.S. Cl.
CPC ................................. B62D 35/002 (2013.01)

(58) Field of Classification Search
CPC .. B62D 35/001; B62D 35/002; B62D 35/007; B62D 35/008; B62D 37/02; B62D 37/04
USPC ........................................... 296/180.1–180.5
See application file for complete search history.

(56) References Cited

U.S. PATENT DOCUMENTS

| | | | | | |
|---|---|---|---|---|---|
| 3,514,023 | A | * | 5/1970 | Brooks | B62D 35/002 |
| | | | | | 296/180.2 |
| 3,904,236 | A | * | 9/1975 | Johnson | B60J 1/20 |
| | | | | | 296/180.2 |

| | | | | | |
|---|---|---|---|---|---|
| 4,067,601 | A | * | 1/1978 | Tuerk | B62D 33/033 |
| | | | | | 52/704 |
| 4,141,580 | A | * | 2/1979 | Ivan | B62D 35/002 |
| | | | | | 296/180.2 |
| 4,264,099 | A | * | 4/1981 | Pierce | B62D 35/002 |
| | | | | | 296/180.2 |
| 4,316,630 | A | * | 2/1982 | Evans | B62D 35/001 |
| | | | | | 296/180.2 |
| 6,846,035 | B2 | * | 1/2005 | Wong | B62D 35/001 |
| | | | | | 296/180.1 |

(Continued)

FOREIGN PATENT DOCUMENTS

| | | | | |
|---|---|---|---|---|
| CN | 111391930 A | * | 7/2020 | B62D 35/02 |
| CN | 113911218 A | | 1/2022 | |
| EP | 1031497 A2 | | 8/2000 | |

OTHER PUBLICATIONS

International Search Report & Written Opinion for PCT/EP2024/080050, Search Completed on Jan. 13, 2025, Mailing date of Jan. 30, 2025, All together 16 Pages.

*Primary Examiner* — Amy R Weisberg

(74) *Attorney, Agent, or Firm* — Dickinson Wright PLLC

(57) ABSTRACT

An adjustable air deflector actuator assembly is disclosed herein. The adjustable air deflector actuator assembly enables control over an air deflector's position, transitioning between non-deployed and deployed states. Components of the actuator assembly include a rotational bracket, a dynamic linear drive, and a response link arm. The bracket, attached to the vehicle, rotates about an axis to govern the air deflector's position. The linear drive, composed of fixed and translating portions, couples to the bracket and the vehicle, while the link arm connects to the air deflector and the bracket, allowing for precise positioning.

18 Claims, 6 Drawing Sheets

(56) References Cited

U.S. PATENT DOCUMENTS

| | | | | |
|---|---|---|---|---|
| 6,886,882 B2 * | 5/2005 | Farlow | .................. | B62D 35/001 |
| | | | | 296/180.1 |
| 7,374,229 B1 * | 5/2008 | Noll | ..................... | B62D 25/182 |
| | | | | 296/180.2 |
| 7,712,822 B2 * | 5/2010 | Pfaff | .................... | B62D 35/001 |
| | | | | 296/180.5 |
| 2004/0075298 A1 | 4/2004 | Wong et al. | | |
| 2013/0057020 A1 * | 3/2013 | Burrell | ................. | B62D 35/001 |
| | | | | 296/180.2 |

* cited by examiner

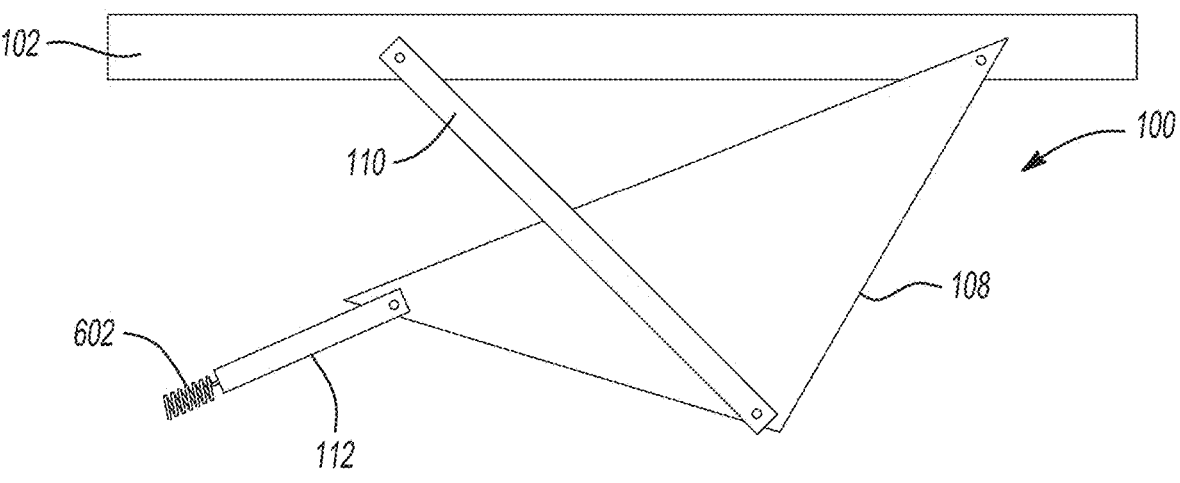
_Fig-6_
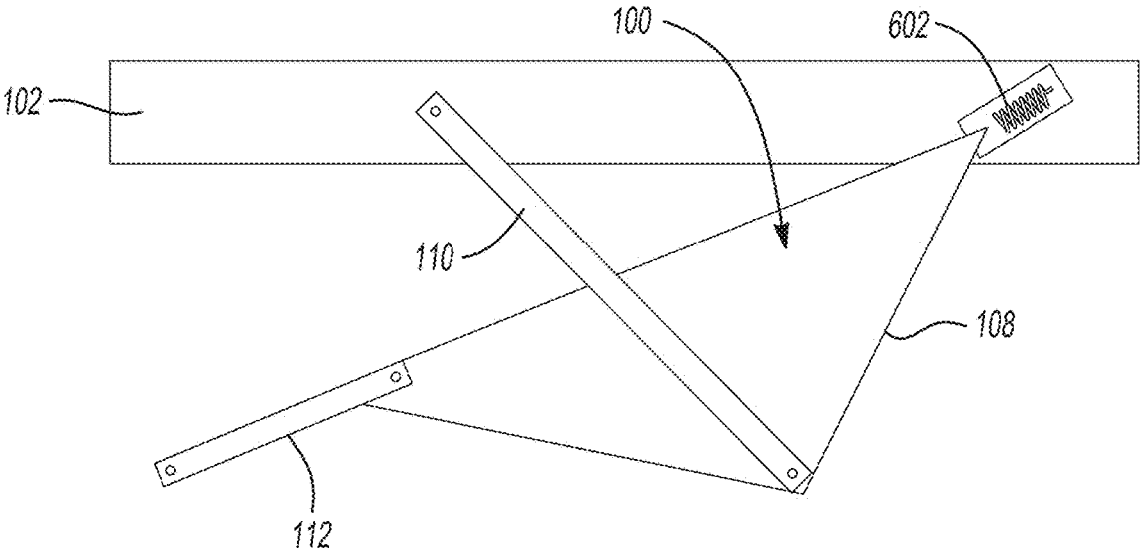
_Fig-7_

ADJUSTABLE AIR DEFLECTOR ACTUATOR ASSEMBLY

TECHNICAL FIELD

The present disclosure relates to an adjustable air deflector actuator assembly for control over the positioning of an air deflector.

BACKGROUND

In the realm of transportation and vehicle design, optimizing aerodynamics is a paramount concern. Enhanced aerodynamic performance not only improves fuel efficiency but also contributes to stability and safety during transit. One critical component in achieving these objectives is the air deflector, a feature found on various types of vehicle, including semi-trailer trucks.

Air deflectors serve the essential function of redirecting airflow around a vehicle, thereby reducing drag and improving overall efficiency. Air deflectors play a pivotal role in managing how air interacts with a vehicle's surfaces, particularly in scenarios where vehicles vary in size or when towing is involved. To address the challenges and opportunities presented by air deflectors, a mechanism is needed for controlling the positioning of air deflectors.

SUMMARY

An aspect of the disclosed embodiments includes an actuator assembly configured for use with a semi-trailer truck, where the semi-trailer truck including a tractor truck operable to tow a semi-trailer. The actuator assembly is configured to move an air deflector relative to a body of the tractor truck between a non-use position and a use position, in which the air deflector is configured to direct air towards one or more sides of the semi-trailer. The actuator assembly comprises: a bracket including a first vertex, a second vertex, and a third vertex, the first vertex configured to be rotationally coupled to the body and rotate relative to the body; a linear drive including a first end and a second end, the first end of the linear drive configured to be rotationally coupled to the body and rotate relative to the body and the second end of the linear drive configured to be pivotally coupled to the second vertex of the bracket; and a link arm including a first end and a second end, the first end of the link arm configured to be pivotally connected to the third vertex of the bracket and the second end of the link arm configured to be pivotally connected to the air deflector.

Another aspect of the disclosed embodiments includes an actuator assembly configured for use with at least one air deflector operatively connected to one of a primary vehicle and a secondary vehicle. The secondary vehicle is configured to be operatively connected to the primary vehicle and the at least one air deflector is configured to change between a non-deployed state and a deployed state. The actuator assembly comprises: a bracket configured to be rotationally coupled to one of the primary vehicle and the secondary vehicle and configured to rotate about a first axis and a linear drive including a fixed portion and a translating portion, one of the fixed portion and the translating portion configured to be rotationally coupled to the one of the primary vehicle and the secondary vehicle and configured to rotate about a second axis, and another of the one of the fixed portion and the translating portion rotationally coupled to the bracket and configured to rotate with respect to the bracket about a third axis, where the translating portion is configured to translate with respect to the fixed portion from a retracted position to an extended position, to move the at least one air deflector from the non-deployed state to the deployed state. The actuator assembly further comprises a link arm including a first end and a second end, the first end of the link arm configured to be rotationally coupled to the air deflector and configured to rotate about a fourth axis, the second end of the link arm rotationally connected to the bracket and configured to rotate with respect to the bracket about a fifth axis between a first position, in which the at least one air deflector is in the non-deployed state, and a second position in which the at least one air deflector is in the deployed state.

Still yet, another aspect of the disclosed embodiments include an actuator assembly configured for use with at least one air deflector operatively connected to a vehicle, where the at least one air deflector is configured to change between a non-deployed state and a deployed state. The actuator assembly comprises: a bracket configured to be rotationally coupled to the vehicle and a linear drive including a fixed portion and a translating portion, where the fixed portion is configured to be coupled to the bracket and rotate with respect to the bracket, and the translating portion is configured to be rotationally coupled to the vehicle and translate with respect to the fixed portion from a retracted position to an extended position to move the at least one air deflector from the non-deployed state to the deployed state. The actuator assembly further comprises a link arm including a first end and a second end, where the first end of the link arm is configured to be rotationally coupled to the air deflector and the second end of the link arm is rotationally connected to the bracket and configured to rotate with respect to the bracket between a first position, in which the at least one air deflector is in the non-deployed state, and a second position, in which the at least one air deflector is in the deployed state.

BRIEF DESCRIPTION OF THE DRAWINGS

FIG. 6 and FIG. 7 generally illustrate application of a spring within the actuator assembly, in accordance with an embodiment.

DETAILED DESCRIPTION

Figure 1:
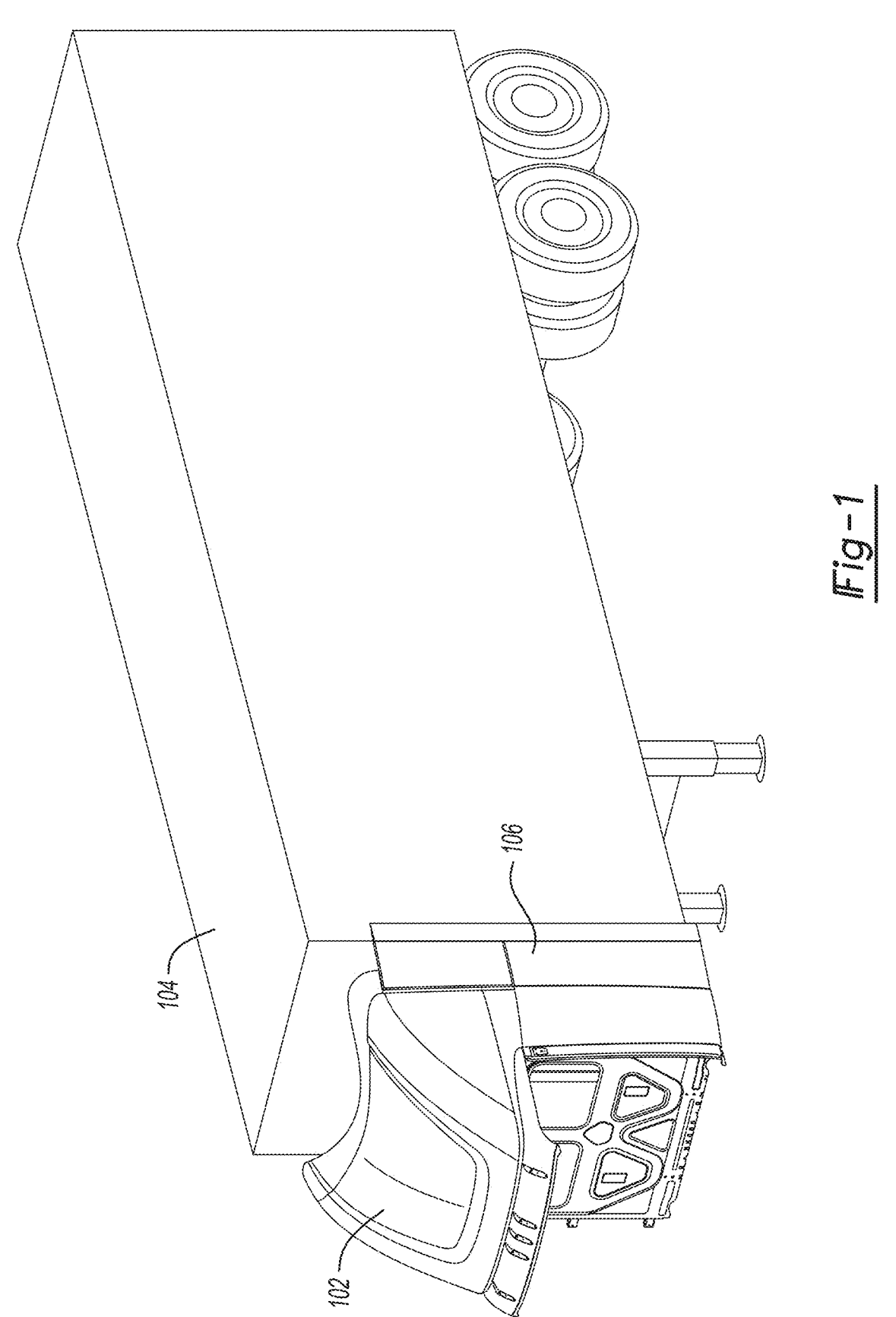
FIG. 1 generally illustrates an air deflector connected a vehicle, in accordance with an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

An air deflector, a feature found on various types of vehicles, serves to redirect airflow. An air deflector plays a pivotal role in enhancing a vehicle's aerodynamics, effectively managing how air interacts with its surfaces. By controlling the airflow, air deflectors help reduce drag and, consequently, improve fuel efficiency.

Embodiments disclosed herein are related to an adjustable air deflector actuator assembly (referred to as "actuator assembly" hereinafter), presenting a solution that allows for precise control over the positioning of an air deflector. For example, the actuator assembly enables an air deflector to transition between a non-deployed state and a deployed state. This functionality offers a range of benefits to vehicle operators. It enables operators to optimize the vehicle's aerodynamics based on the prevailing driving conditions. For instance, when towing a trailer or cruising at high speeds, deploying the air deflector minimizes wind resistance, resulting in notable fuel efficiency improvements. Conversely, in urban settings or when enjoying a scenic drive with open windows, retracting the deflector reduces turbulence and noise. Moreover, the flexibility to switch between deployed and non-deployed states ensures adaptability, especially in off-road or rugged terrain scenarios where deflector damage risk may be a concern.

One objective of the actuator assembly is the optimization of vehicle aerodynamic performance. Specifically, the embodiments outlined in this disclosure enable vehicle operators to finely tune the air deflector's position, smoothly transitioning between non-deployed and deployed states. This level of control ensures the vehicle can effectively manage airflow, resulting in tangible fuel savings and enhanced stability during transportation.

To illustrate this further, FIG. 1 generally illustrates an air deflector 106 connected a primary vehicle 102, which in FIG. 1 is depicted as a semi-trailer truck for context. In this scenario, the truck responsible for towing is referred to as primary vehicle 102, while the semi-trailer itself is referenced as a secondary vehicle 104. In FIG. 1, air deflector 106 is shown connected to a side of primary vehicle 102. While FIG. 1 illustrates air deflector 106 connected to the side of primary vehicle 102, it is important to note that in some embodiments, air deflector 106 may be positioned differently on both primary vehicle 102 and secondary vehicle 104. For example, in some embodiments, air deflector 106 could be mounted on a roof of primary vehicle 102 and/or position at the front or rear of secondary vehicle 104. The strategic placement of air deflector 106 on primary vehicle 102 and secondary vehicle 104 enables efficient airflow management across primary vehicle 102 and secondary vehicle 104.

Figure 2:
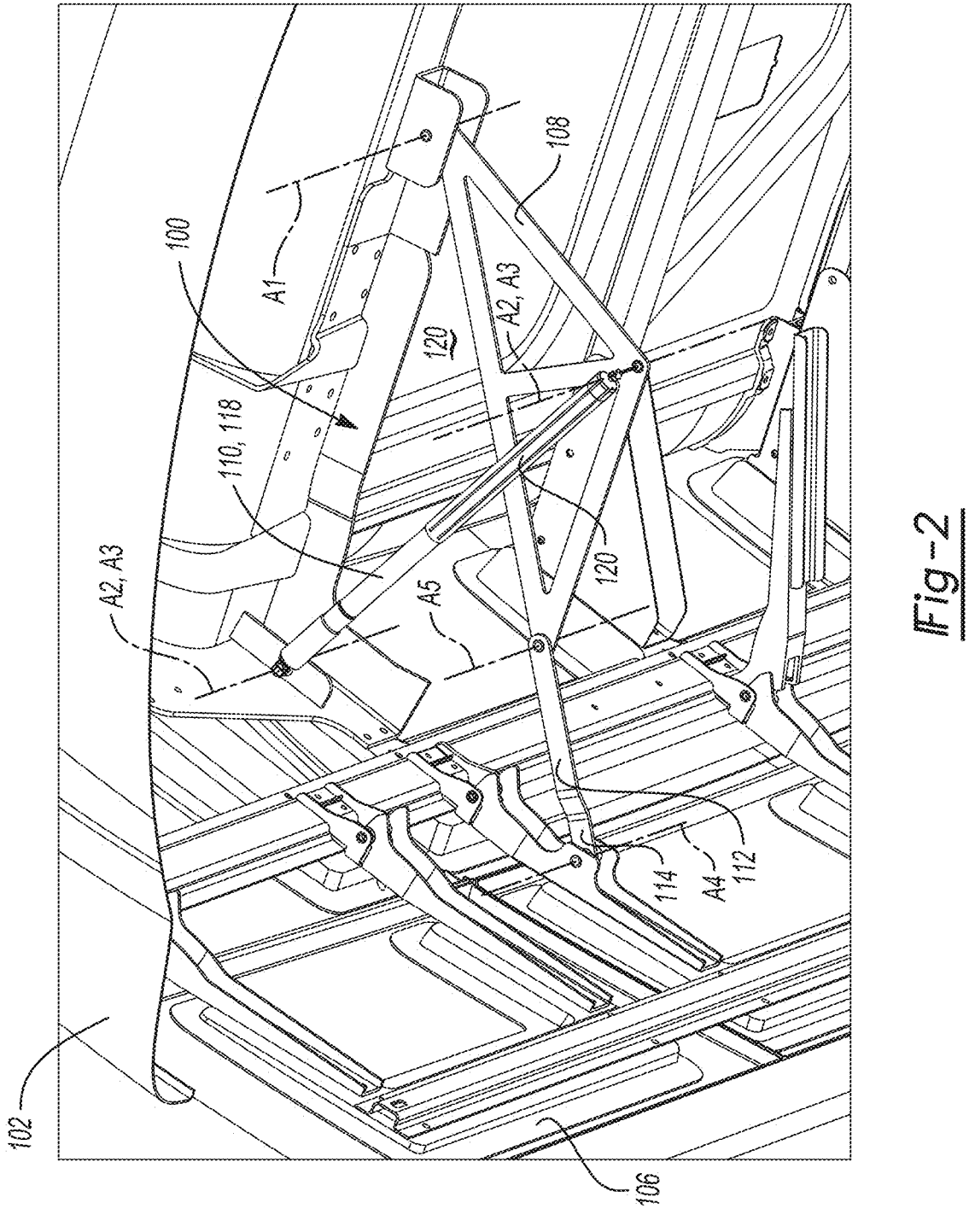
FIG. 2 generally illustrates an actuator assembly, which is designed to control the positioning of one or more air deflectors, in accordance with an embodiment.

FIG. 2 generally illustrates an actuator assembly 100, which is designed to control the positioning of one or more air deflectors 106. Air deflector 106 is tailored to enhance vehicle aerodynamics by managing the flow of air during transit. The adaptability of actuator assembly 100 allows it to be effectively employed with both primary vehicle 102 and secondary vehicle 104, as introduced in FIG. 1. Actuator assembly 100 is configured to move an air deflector relative to a body of the vehicle between a non-use position (also referred to as non-deployed state herein) and a in-use position (also referred to as deployed state herein), in which the air deflector is configured to direct air towards one or more sides of the semi-trailer.

In FIG. 2, air deflector 106 is observed in its deployed state, primed to optimize airflow management. As also depicted in FIG. 2, actuator assembly 100 comprises several components. Notably, it includes a central structural element referred to herein as a bracket 108. Bracket 108, pivotally coupled to either primary vehicle 102 and/or secondary vehicle 104, is configured to rotate about a first axis, denoted as A1. In FIG. 2, bracket 108 forms a geometric structure resembling two interconnected right triangles sharing a common hypotenuse. However, in some embodiments, bracket 108 may assume alternative geometric configurations, such as forming a semi-circle or a simplified triangular frame. The geometric configuration of bracket 108 may be adapted to be compatible with specific aerodynamic requirements and operational needs.

In some embodiments, as depicted in FIG. 2, bracket 108 may be triangular in shape and include a first vertex 126, a second vertex 122, and a third vertex 124. As used herein, vertex refers to a point where two or more edges of bracket 108 meet to form an angle. As further illustrated in FIG. 2, bracket 108 may be coupled to primary vehicle 102 at first vertex 126, fixed portion of linear drive 118 may be coupled to second vertex 122 of bracket 108, and bracket 108 may be configured to be coupled to second end of link arm 116 at third vertex 124 of bracket 108. In some embodiments, and as further depicted in FIG. 2, bracket 108 may form a geometric structure resembling two interconnected right triangles sharing a common hypotenuse.

Actuator assembly 100 also incorporates a linear drive 110, comprising a fixed portion of linear drive 118 and a translating portion 120. Fixed portion of linear drive 118 and translating portion 120 is configured to be coupled to primary vehicle 102 and capable of rotating about a second axis A2. Furthermore, fixed portion of linear drive 118 and translating portion 120 are configured to connect to bracket 108 and rotate with respect to it about a third axis A3. Translating portion 120 is configured to move from a retracted position to an extended position, facilitating the transition of at least air deflector 106 from a non-deployed state to a deployed state.

Actuator assembly 100 also incorporates a link arm 112, which serves as a mechanical link between air deflector 106 and actuator assembly 100. Link arm 112 possesses a first end 114, which is configured to be rotationally coupled to air deflector 106 and capable of rotating about a fourth axis A4, and a second end of link arm 112, which is configured to connect to bracket 108 and capable of rotation about a fifth axis A5. This mechanical arrangement allows for precise control over the position of the air deflector, enabling seamless transitions between non-deployed and deployed states.

Figure 3:
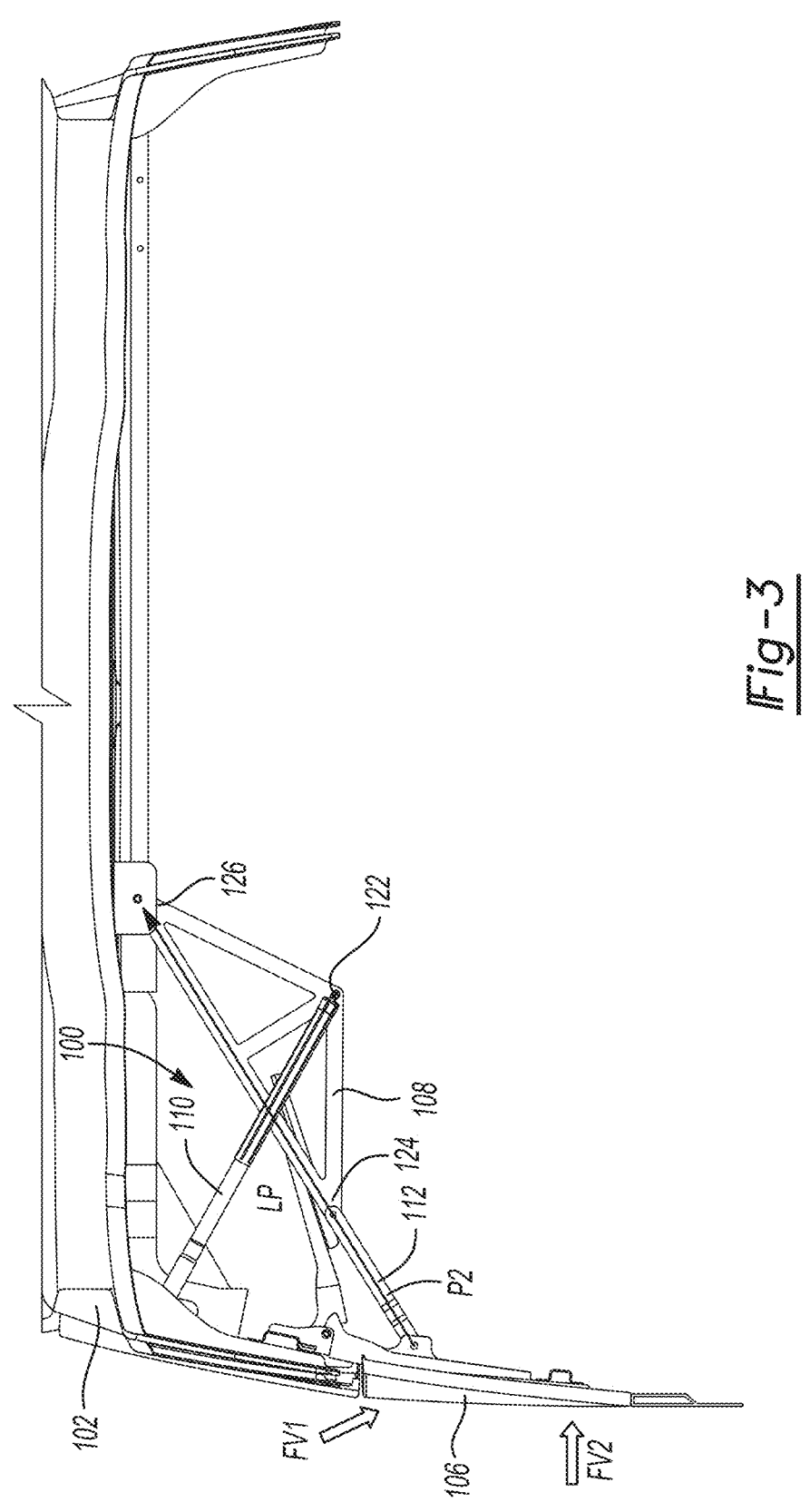
FIG. 3 generally demonstrates how various forces come into play when an air deflector is in a deployed state, in accordance with an embodiment.

FIG. 3 generally demonstrates how various forces come into play when the air deflector is in the deployed state. For example, force vector FV1 represents a force exerted by wind or air on air deflector 106. The direction of FV1 corresponds to the direction in which the wind or air pushes air deflector 106. The magnitude of force vector FV1 hinges on several factors, including airspeed, air density, the surface area of the air deflector, and its shape.

Additionally, in FIG. 3, force vector FV2 captures the forces applied to air deflector 106 when it encounters lateral impacts from the side, such as crosswinds, turbulence, or any external force acting perpendicular to the vehicle's direction of motion. The direction of force vector FV2 is perpendicular to the air deflector's surface, and the magnitude of force vector FV2 varies with the strength and direction of the side impact, with strong crosswinds and sudden lateral disturbances yielding higher force values.

In FIG. 3, link arm 112 is arranged in a position P2 that facilitates the deployment of air deflector 106. As represented in FIG. 3, when link arm 112 is situated in position P2, link arm 112 is substantially aligned with a base of bracket 108. The arrangement of link arm 112 in position P2 allows actuator assembly 100 to effectively manage the forces exerted by FV1 and FV2. LP2, referenced here, illustrates the pathway through which these forces are transmitted or transferred within the actuator assembly 100. This depiction provides insight into how FV1 and FV2 are distributed along bracket 108 and link arm 112, ensuring optimal aerodynamic performance during transit.

Figure 4:
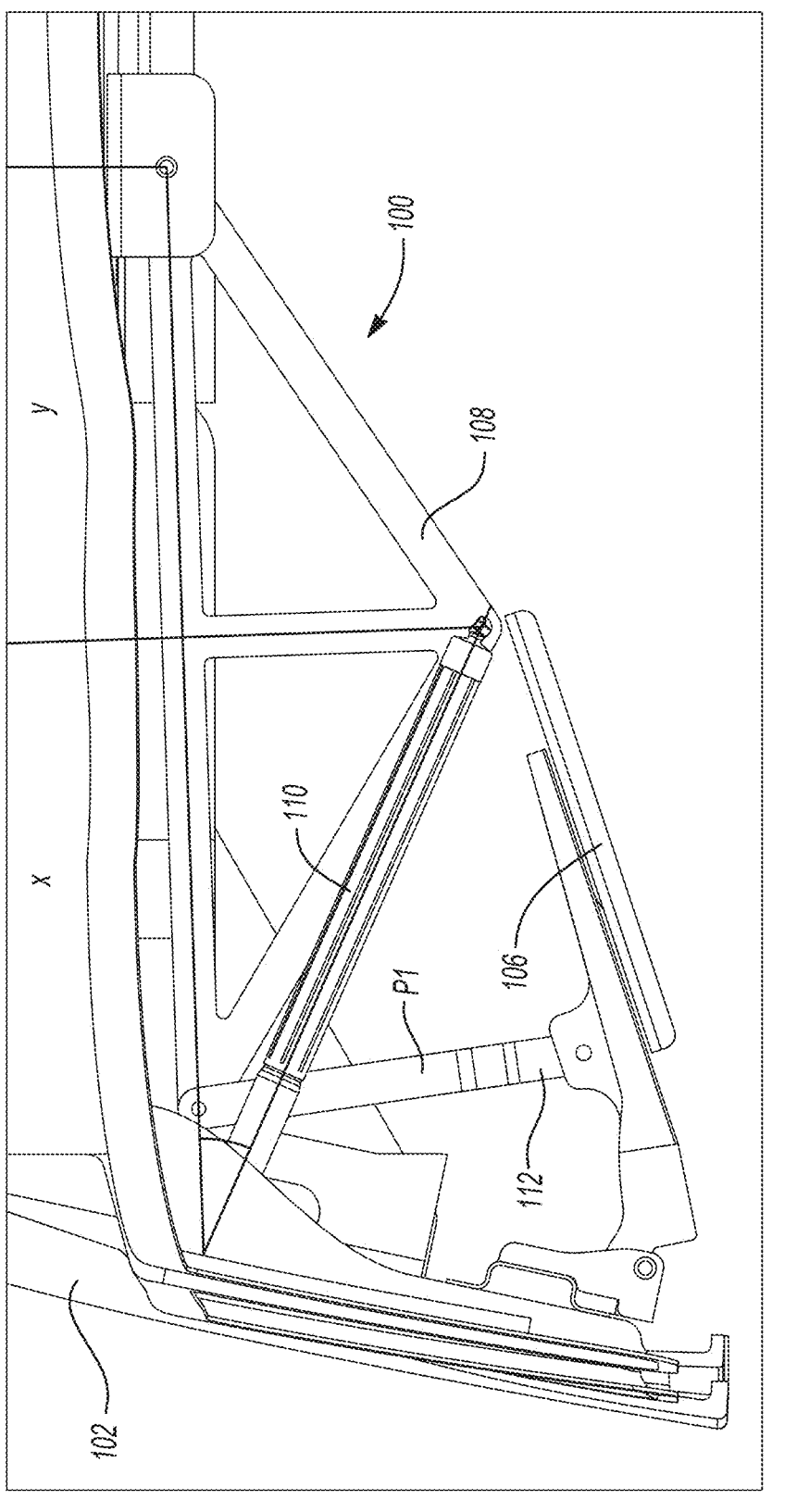
FIG. 4 generally illustrates a link arm of the actuator assembly in a position that enables an air deflector to be placed in a non-deployed state, in accordance with an embodiment.

FIG. 4 generally illustrates link arm 112 arranged in a position P1. This specific orientation enables air deflector 106 to remain in the non-deployed state, allowing the vehicle to adapt to different scenarios. As shown in FIG. 4, when in position P1, bracket 108 securely abuts the side of the primary vehicle 102. As shown in FIG. 4, in accordance with embodiments disclosed herein, bracket 108 forms a geometric structure resembling two interconnected right triangles sharing a common hypotenuse. Within this context, 'x' represents the distance from the hypotenuse to the pivot point where link arm 112 connects to bracket 108, while 'y' signifies the distance from the hypotenuse to the pivot point where bracket 108 connects to the primary vehicle 102. This demonstrates the adaptability of actuator assembly 100, ensuring that air deflector 106 can seamlessly transition between states, optimizing the vehicle's aerodynamics as needed.

Figure 5:
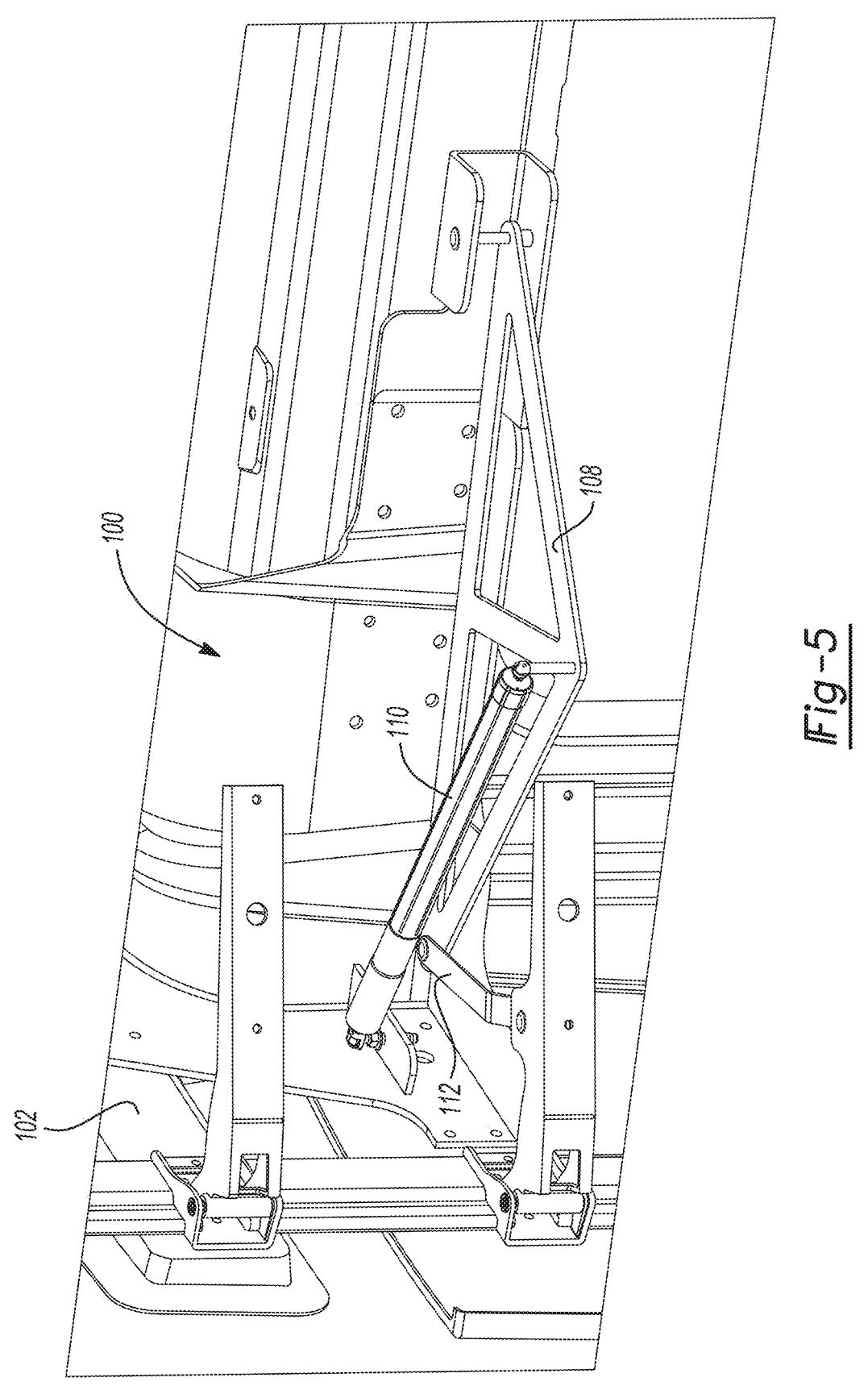
FIG. 5 generally illustrates another perspective view of an air deflector in the non-deployed state, in accordance with an embodiment.

FIG. 5 generally illustrates another perspective view of air deflector 106 in the non-deployed state. For example, in FIG. 5, as also depicted in FIG. 4, link arm 112 is in position P1, which enables air deflector 106 to be positioned into the non-deployed state. In this configuration, air deflector 106 remains retracted, aligning with a body of primary vehicle 102. This state is conducive to scenarios where minimal aerodynamic modification is required.

FIG. 6 and FIG. 7 generally illustrate application of a spring within actuator assembly 100, in accordance with embodiments disclosed herein. For example, in FIG. 6, a spring 602 is affixed to the first end of the link arm 112, which in turn, connects to air deflector 106. In contrast, FIG. 7 displays spring 602 attached to bracket 108, which in turn, connects bracket 108 to primary vehicle 102.

This integration of spring 602 into actuator assembly 100 extends the range of positioning for air deflector 106. This is useful when fine-tuning an air deflector's angle required to optimize airflow and vehicle aerodynamics in varying conditions, such as changing wind speeds or cargo loads. Additionally, springs can be adjusted to provide a specific amount of resistance or force. This allows actuator assembly 100 to adapt to environmental factors, such as strong crosswinds or turbulence. Further, by incorporating a spring, shocks and vibrations can be absorbed, reducing wear and tear on components of actuator assembly 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST actuator assembly 100
primary vehicle, tractor truck 102
secondary vehicle, semi-trailer 104
air deflector 106
bracket 108
linear drive 110
link arm 112
first end of link arm 114
second end of link arm 116
fixed portion of linear drive 118
translating portion of linear drive 120
spring 602
first vertex of bracket 126
second vertex of bracket 122
third vertex of bracket 124
first position link arm P1
second position link arm P2
first axis A1
second axis A2
third axis A3
fourth axis A4
fifth axis A5
Force Vector 1 (wind/air) FV1
Force Vector 2 (side impact) FV2
Load Path LP

What is claimed is:

1. An actuator assembly configured for use with a semi-trailer truck, the semi-trailer truck including a tractor truck operable to tow a semi-trailer, the actuator assembly configured to move an air deflector relative to a body of the tractor truck between a non-use position and a use position, in which the air deflector is configured to direct air towards one or more sides of the semi-trailer, the actuator assembly comprising:

a bracket triangular in shape and including a first vertex, a second vertex, and a third vertex, the first vertex configured to be rotationally coupled to the body and rotate relative to the body;

a linear drive including a first end and a second end, the first end of the linear drive configured to be rotationally coupled to the body and rotate relative to the body and the second end of the linear drive configured to be pivotally coupled to the second vertex of the bracket; and a link arm including a first end and a second end, the first end of the link arm configured to be pivotally connected to the air deflector and the second end of the link arm configured to be pivotally connected to the third vertex of the bracket.

2. The actuator assembly of claim 1, wherein the first vertex is configured to rotate about a first axis.

3. The actuator assembly of claim 2, wherein the first end of the linear drive includes a translating portion that is configured to rotate about a second axis.

4. The actuator assembly of claim 3, wherein the second end of the linear drive includes a fixed portion that is configured to rotate about a third axis.

5. The actuator assembly of claim 4, wherein the translating portion is configured to translate with respect to the fixed portion from a retracted position to an extended position to move the air deflector from the non-use position to the use position.

6. The actuator assembly of claim 5, wherein the first end of the link arm is configured to rotate about a fourth axis.

7. The actuator assembly of claim 6, wherein the second end of the link arm is configured to rotate with respect to the bracket about a fifth axis.

8. The actuator assembly of claim 1, wherein the link arm is configured to move between a first position in which the air deflector is in the non-used position and a second position in which the air deflector is in in-use position.

9. The actuator assembly of claim 1, wherein the bracket forms a geometric structure resembling two interconnected right triangles sharing a common hypotenuse.

10. An actuator assembly configured for use with at least one air deflector operatively connected to one of a primary vehicle and a secondary vehicle, the secondary vehicle configured to be operatively connected to the primary vehicle, the at least one air deflector configured to change between a non-deployed state and a deployed state, the actuator assembly comprising:

a bracket wherein the bracket forms a geometric structure resembling two interconnected right triangles sharing a common hypotenuse and is configured to be rotationally coupled to one of the primary vehicle and the secondary vehicle at a first vertex of the bracket and configured to rotate about a first axis;

a linear drive including a fixed portion and a translating portion, one of the fixed portion and the translating portion configured to be rotationally coupled to the one of the primary vehicle and the secondary vehicle and configured to rotate about a second axis, and another of the one of the fixed portion and the translating portion rotationally coupled to a second vertex of the bracket and configured to rotate with respect to the bracket about a third axis, wherein the translating portion is configured to translate with respect to the fixed portion from a retracted position to an extended position, to move the at least one air deflector from the non-deployed state to the deployed state, and wherein the fixed portion of the linear drive; and a link arm including a first end and a second end, the first end of the link arm configured to be rotationally coupled to the air deflector and configured to rotate about a fourth axis, the second end of the link arm rotationally connected to a third vertex of the bracket and configured to rotate with respect to the bracket about a fifth axis between a first position, in which the at least one air deflector is in the non-deployed state, and a second position in which the at least one air deflector is in the deployed state.

11. An actuator assembly configured for use with at least one air deflector operatively connected to a vehicle, the at least one air deflector configured to change between a non-deployed state and a deployed state, the actuator assembly comprising:

a bracket configured to be rotationally coupled to the vehicle and configured to rotate along a first plane;

a linear drive including a fixed portion and a translating portion, the fixed portion configured to be coupled to the bracket and rotate with respect to the bracket, and the translating portion configured to be rotationally coupled to the vehicle and translate along a second plane with respect to the fixed portion from a retracted position to an extended position to move the at least one air deflector from the non-deployed state to the deployed state, wherein the first plane is substantially parallel to the second plane; and a link arm including a first end and a second end, the first end of the link arm configured to be rotationally coupled to the air deflector, the second end of the link arm rotationally connected to the bracket and configured to rotate with respect to the bracket between a first position, in which the at least one air deflector is in the non-deployed state, and a second position, in which the at least one air deflector is in the deployed state.

12. The actuator assembly of claim 11, wherein the bracket is triangular in shape.

13. The actuator assembly of claim 12, wherein the bracket is configured to be coupled to the vehicle at a first vertex.

14. The actuator assembly of claim 13, wherein the fixed portion of the linear drive is configured to be coupled to a second vertex of the bracket.

15. The actuator assembly of claim 14, wherein the bracket is configured to be coupled to the second end of the link arm at a third vertex of the bracket.

16. The actuator assembly of claim 11, wherein the link arm is disposed between the first plane and the second plane.

17. The actuator assembly of claim 10, wherein the fixed portion of the linear drive is configured to be rotationally coupled to the second vertex of the bracket, and the translating portion is configured to be rotationally coupled to the primary vehicle.

18. The actuator assembly of claim 10, wherein the bracket is configured to be rotationally coupled to the primary vehicle at the first vertex.

* * * * *